(12) United States Patent
Park et al.

(10) Patent No.: US 8,803,953 B2
(45) Date of Patent: Aug. 12, 2014

(54) STEREOSCOPIC IMAGE DISPLAY DEVICE AND DRIVING METHOD THEREOF

(75) Inventors: Joonyoung Park, Gyeonggi-do (KR);
Joonha Park, Gyeonggi-do (KR);
Hyeonho Son, Gyeonggi-do (KR);
Changho Lee, Gyeonggi-do (KR);
Jaewoo Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 332 days.

(21) Appl. No.: 12/967,127

(22) Filed: Dec. 14, 2010

(65) Prior Publication Data

US 2012/0033053 A1 Feb. 9, 2012

(30) Foreign Application Priority Data

Aug. 5, 2010 (KR) .................. 10-2010-0075527
Oct. 14, 2010 (KR) .................. 10-2010-0100171

(51) Int. Cl.
*H04N 13/04* (2006.01)
*H04N 13/00* (2006.01)

(52) U.S. Cl.
USPC .............................................. 348/51; 348/43

(58) Field of Classification Search
CPC H04N 13/0497; H04N 13/0438; G09G 3/003
See application file for complete search history.

(56) References Cited

U.S. PATENT DOCUMENTS

| | | | | |
|---|---|---|---|---|
| 5,990,936 A * | 11/1999 | Nakayoshi et al. | ............. | 348/56 |
| 6,456,432 B1 * | 9/2002 | Lazzaro et al. | ............... | 359/464 |
| 6,687,399 B1 * | 2/2004 | Chuang et al. | ................ | 382/154 |
| 7,084,845 B2 * | 8/2006 | Hong | ............................... | 345/89 |
| 7,733,297 B2 * | 6/2010 | Horikoshi et al. | .............. | 345/31 |
| 2001/0020928 A1 * | 9/2001 | Yanagisawa et al. | ........... | 345/98 |

(Continued)

FOREIGN PATENT DOCUMENTS

| | | |
|---|---|---|
| CN | 101222648 A | 7/2008 |
| EP | 2 237 228 A2 | 6/2011 |
| JP | 2009-175346 A | 8/2009 |
| KR | 10-2010-0032284 A | 3/2010 |

OTHER PUBLICATIONS

First Office Action dated Oct. 25, 2013 from The State Intellectual Property Office of the People's Republic of China in counterpart Chinese application No. 201010610489.6.

(Continued)

*Primary Examiner* — Joseph Ustaris
*Assistant Examiner* — Zhubing Ren
(74) *Attorney, Agent, or Firm* — Morgan, Lewis & Bockius LLP

(57) ABSTRACT

A stereoscopic image display device comprises a display panel; a panel driving unit configured to address left eye image data in all pixels of the display panel during a data addressing period set in an N-th (where N is a natural number) frame period and adjust voltages of all the pixels of the display panel to a black grayscale voltage during a black grayscale inserting period set in the N-th frame period, address right eye image data in all the pixels of the display panel during a data addressing period set in a (N+1)-th frame period and adjust voltages of all the pixel of the display panel to the black grayscale voltage during a black grayscale inserting period set in the (N+1)-th frame period; and a controller configured to supply the left eye image data, and the right eye image data to the panel driving unit and control operation timings of the panel driving unit.

17 Claims, 12 Drawing Sheets

(56) References Cited

U.S. PATENT DOCUMENTS

| | | | |
|---|---|---|---|
| 2006/0279523 A1* | 12/2006 | Nitta et al. | 345/102 |
| 2007/0132709 A1* | 6/2007 | Kawaguchi | 345/102 |
| 2008/0062104 A1* | 3/2008 | Lee | 345/90 |
| 2008/0094334 A1* | 4/2008 | Baek et al. | 345/89 |
| 2009/0115772 A1* | 5/2009 | Shiomi et al. | 345/214 |
| 2009/0278918 A1* | 11/2009 | Marcus et al. | 348/54 |

OTHER PUBLICATIONS

KIPO: Office Action for Korean Patent Application No. 10-2010-0100171—Issued on Apr. 19, 2013.

* cited by examiner

STEREOSCOPIC IMAGE DISPLAY DEVICE AND DRIVING METHOD THEREOF

This application claims the benefit of Korea Patent Application No. 10-2010-0075527 filed on Aug. 5, 2010, and Korean Patent Application No. 10-2010-0100171 filed on Oct. 14, 2010, both of which are incorporated herein by reference for all purposes as if fully set forth herein.

BACKGROUND

1. Field

This document relates to an stereoscopic image display device and a driving method thereof.

2. Related Art

Stereoscopic image display devices are classified into a stereoscopic technique and an autostereoscopic technique. The stereoscopic technique uses binocular parallax images which are great in the stereoscopic effect, and may have a type of using glasses and a type of not using glasses. In the type of using glasses ("glass type"), binocular parallax images are displayed on a direct view display panel or a projector by changing polarization directions or in the temporal division manner, and polarization glasses or liquid crystal shutter glasses are used to implement stereoscopic images. In the type of not using glasses ("glassless type"), the stereoscopic images are implemented by dividing optical axes of binocular parallax images, by using optical plates such as parallax barriers provided at front and rear surfaces of a display panel.

The glass type stereoscopic image display device typically displays left eye images and right eye images on a display panel in a temporal division manner. The glasses worn by a user is constituted by a left eye shutter which transmits light for left eye images and a right eye shutter which transmits light for right eye images. Thus, the user sees only the left eye images, for example, during odd frames, and sees only the right eye image during even frames, thereby obtaining a three-dimensional effect by a binocular parallax.

In a liquid crystal display to implement stereoscopic images, liquid crystal of the liquid crystal display is slow in a response speed due to characteristics such as unique viscosity and elasticity, as shown in Equations (1) and (2).

$$\tau_r \propto \frac{\gamma d^2}{\Delta \varepsilon |V_a^2 - V_F^2|} \quad (1)$$

In Equation (1), $T_r$ indicates a rising time when a voltage is applied to the liquid crystal, $V_a$ indicates an applied voltage, $V_F$ indicates Freederick transition voltage when the liquid crystal molecules starts a tilted motion, d indicates a cell gap of a liquid crystal cell, and $\gamma$ indicates a rotational viscosity of the liquid crystal molecules.

$$\tau_f \propto \frac{\gamma d^2}{K} \quad (2)$$

In Equation (2), $\tau_f$ indicates a falling time when the liquid crystal is recovered to an original position due to the elastic recovery after the liquid crystal stops being applied with a voltage, and K indicates a modulus of elasticity unique to the liquid crystal.

The shutter glasses type stereoscopic image display device display left eye images and right eye images on a display panel in the temporal division manner. For this reason, the stereoscopic image display device is required to be driven at a higher frame frequency than a frame frequency of a 2D display device so as to temporally divide the left eye images and right eye images.

In the stereoscopic image display device, when driven at the frame frequency of 120 Hz, a data voltage for a next monocular (right eye or left eye) image is charged in the liquid crystal cell in the state where a data voltage for a previous monocular (left eye or right eye) image which has already been charged therein remains. Therefore, a user may feel a 3D crosstalk where the left eye images and the right eye images overlap each other if viewing stereoscopic images through a stereoscopic image display device driven at the frame frequency of 120 Hz.

As methods for solving the 3D crosstalk, there is a method where the frame frequency is increased to 240 Hz, and a frame period during which a black grayscale voltage is written in all the liquid crystal cells is inserted between a previous monocular image frame and a next monocular image frame. In this method, voltages at the liquid crystal cells are changed to the black grayscale voltage during the black grayscale inserting frame period and then next monocular image data voltages are written in the liquid crystal cells during a next frame period, thereby reducing the 3D crosstalk. However, this method has a problem in that a high frame frequency is required and thus costs of driving circuits increase. Therefore, there is a great request for a driving method in which the stereoscopic image display device drives 3D images at the frame frequency of the 120 Hz and the 3D crosstalk is not recognized.

SUMMARY

Embodiments of this document provide a stereoscopic image display device and a driving method thereof, capable of driving 3D images at a frame frequency of 120 Hz and reducing the 3D crosstalk.

According to an exemplary embodiment of this document, there is provided a stereoscopic image display device comprising a display panel; a panel driving unit configured to address left eye image data in all pixels of the display panel during a data addressing period set in an N-th (where N is a natural number) frame period and adjust voltages of all the pixels of the display panel to a black grayscale voltage during a black grayscale inserting period set in the N-th frame period, address right eye image data in all the pixels of the display panel during a data addressing period set in a (N+1)-th frame period and adjust voltages of all the pixel of the display panel to the black grayscale voltage during a black grayscale inserting period set in the (N+1)-th frame period; and a controller configured to supply the left eye image data, and the right eye image data to the panel driving unit and control operation timings of the panel driving unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
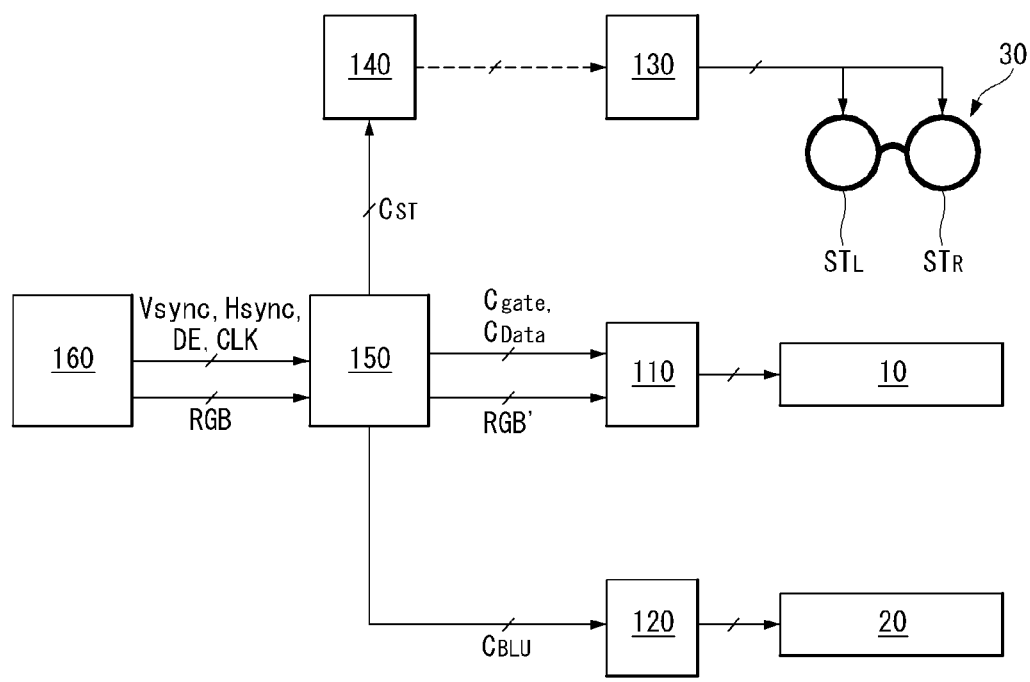
FIG. 1 is a block diagram illustrating a stereoscopic image display device according to a first embodiment of this document.

Hereinafter, embodiments of this document will be described in detail with reference to the accompanying drawings. Like reference numerals designate like elements throughout the specification. In the following description, when a detailed description of well-known functions or configurations related to this document is determined to unnecessarily cloud a gist of the present invention, the detailed description thereof will be omitted.

Names of the respective elements used in the following description are selected for convenience of writing the specification and may be thus different from those in actual products.

A display panel of this document may be implemented by a flat display device such as a liquid crystal display (LCD), a field emission display (FED), a plasma display panel (PDP), and an organic light emitting diode (OLED) display. The embodiments of this document will be described by exemplifying the LCD, but it is noted that the present invention is not limited to the LCD.

Figure 2:
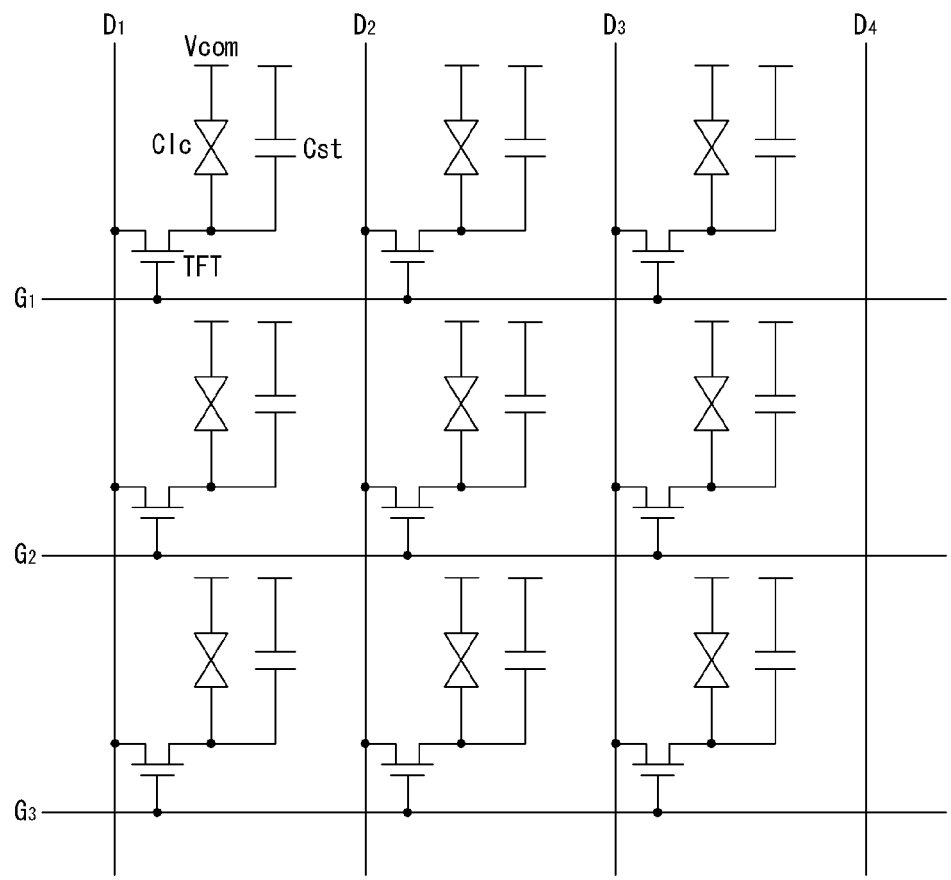
FIG. 2 is a detailed block diagram illustrating a TFT substrate of the display panel in FIG. 1.

Referring to FIGS. 1 and 2, according to a first embodiment of the present invention, the stereoscopic image display device comprises a display panel 10, a backlight unit 20, liquid crystal shutter glasses 30, a display panel driving unit 110, a backlight unit driver 120, a liquid crystal shutter glasses control signal receiver 130, a liquid crystal shutter glasses control signal transmitter 140, a controller 150, and a system board 160.

The display panel 10 alternately displays left eye image data RGBL and right eye image data RGBR under the control of the controller 150. The display panel 10 may display 2D image data RGB in which left eye image data and right eye image data are not differentiated, under the control of the controller 150. The display panel 10 may employ a hold type display device which requires the backlight unit 20. The hold type display device may employ a transmissive liquid crystal display panel which converts light from the backlight unit 20, as a representative. It is noted that the display panel 10, as described above, may be implemented by a self-emission flat display device such as a liquid crystal display (LCD), a field emission display (FED), a plasma display panel (PDP), and an organic light emitting diode (OLED) display.

The liquid crystal display panel is provided with a thin film transistor ("TFT") array substrate and a color filter array substrate. A liquid crystal layer is disposed between the TFT array substrate and the color filter array substrate.

As shown in FIG. 2, the TFT array substrate is provided with data lines D (e.g., D1-D4 in FIG. 2) and gate lines G (or scan lines) (e.g., G1-G3 in FIG. 2) intersecting each other on a lower glass substrate, and liquid crystal cells Clc (or pixels) arranged in a matrix in cell regions defined by the intersection of the data lines D and the gate lines G. The TFTs disposed at the intersections of the data lines D and the gate lines G transmit data voltages supplied via the data lines D to pixel electrodes in the liquid crystal cells Clc, in response to scan pulses from the gate lines G. For this, gate terminals of the TFTs are connected to the gate lines G, and source terminals thereof are connected to the data lines D. Drain terminals of the TFTs are connected to the pixel electrodes and storage capacitors Cst in the liquid crystal cells. The storage capacitors Cst maintain data voltages transmitted to the pixel electrodes for a constant time until next data voltages are supplied. Common electrodes opposite to the pixel electrodes are applied with a common voltage Vcom. The color filter array substrate is provided with black matrices and color filters on an upper glass substrate. The common electrodes are disposed on the upper glass substrate in a vertical electric field driving type such as a TN (twisted nematic) mode and a VA (vertical alignment) mode, and are disposed on the lower glass substrate along with the pixel electrodes in a horizontal electric field type such as an IPS (in plane switching) mode and an FFS (fringe field switching) mode.

Polarizers are respectively attached to the outer surfaces of the lower and upper glass substrate of the transmissive liquid crystal display panel, and alignment layers are formed on the inner surfaces having contact with the liquid crystal layer to set pretilt angles of the liquid crystal layer. Spacers are disposed between the upper glass substrate and the lower glass substrate so as to keep the cell gap of the liquid crystal layer. The transmissive liquid crystal display panel may be implemented by a liquid crystal display panel of any other type as well as liquid crystal display panels of the TN mode, the VA mode, the IPS mode, and the FFS mode.

Figure 3:
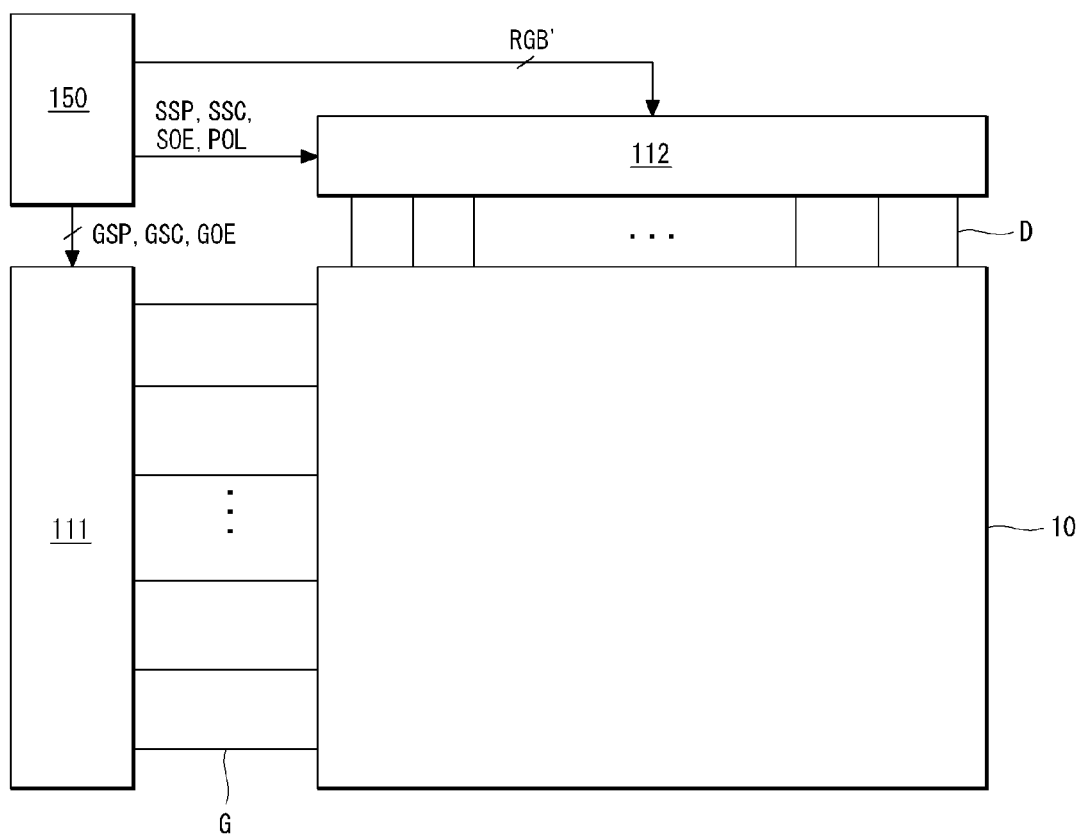
FIG. 3 is a detailed block diagram illustrating the display panel, the display panel driving unit, and the controller in FIG. 1.

FIG. 3 is a detailed block diagram illustrating the display panel 10, the display panel driving unit 110, and the controller 150 in FIG. 1.

Figure 5:
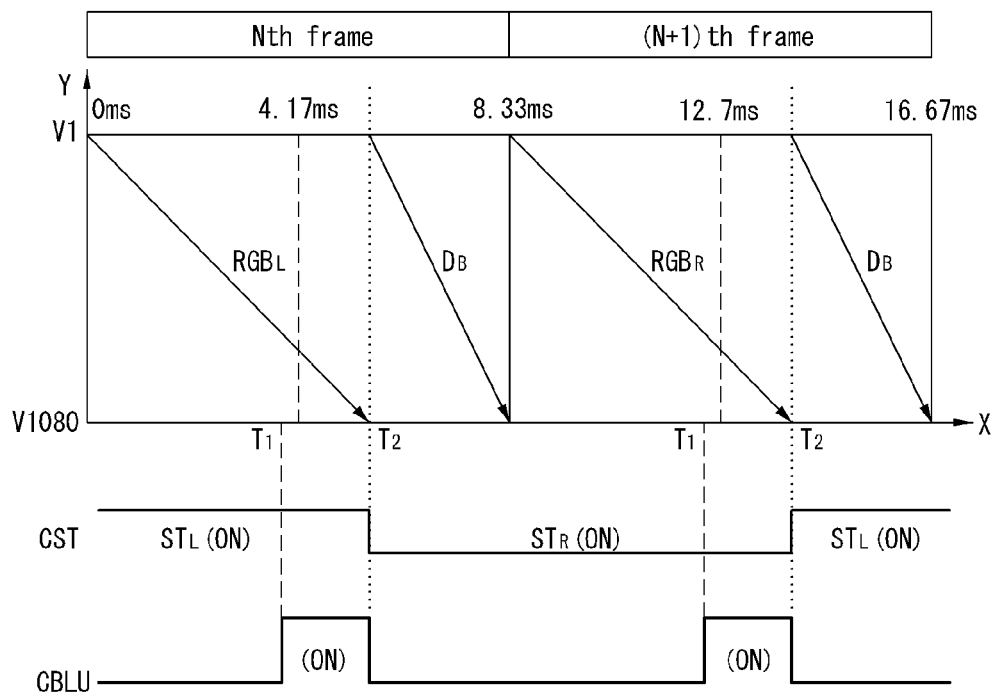
FIG. 5 is a waveform diagram illustrating driving waveforms for the stereoscopic image display device according to an embodiment of this document.

In FIG. 3, the display panel driving unit 110 comprises a data driving circuit 112 and a gate driving circuit 111. In this embodiment, under the control of the controller 150, the display panel driving unit 110 addresses left eye image data to all the liquid crystal cells in the display panel 10 and then addresses black grayscale data to all the liquid crystal cells in the display panel 10 during the N-th (where N is a natural number) frame period. Thereafter, the display panel driving unit 110 addresses right eye image data to all the liquid crystal cells in the display panel 10 and then addresses the black grayscale data to all the liquid crystal cells in the display panel 10 during the (N+1)-th frame period. Specifically, the display panel driving unit 110 addresses left eye image data in all pixels of the display panel 10 during a data addressing period set in an N-th frame period, and adjusts voltages of all the pixels of the display panel 10 to a black grayscale voltage according to the black grayscale data during a black grayscale inserting period set in the N-th frame period. Thereafter, the display panel driving unit 110 addresses right eye image data in all the pixels of the display panel 10 during a data addressing period set in a (N+1)-th frame period and adjusts voltages of all the pixel of the display panel 10 to the black grayscale voltage according to the black grayscale data during a black grayscale inserting period set in the (N+1)-th frame period. The data addressing period indicates a period for addressing left eye image data or right eye image data in all pixels of the display panel, and the black grayscale inserting period indicates a period for adjusting voltages of all the pixels of the display panel to a black grayscale voltage. As shown in FIG. 5, the data addressing period corresponds to a period from a start point of the N-th frame period (or the (N+1)-th frame period) to a point when a predetermined time T2 has elapsed, and the black grayscale inserting period corresponds to a period from the predetermined time T2 to an end point of the N-th frame period (or the (N+1)-th frame period).

Figure 11:
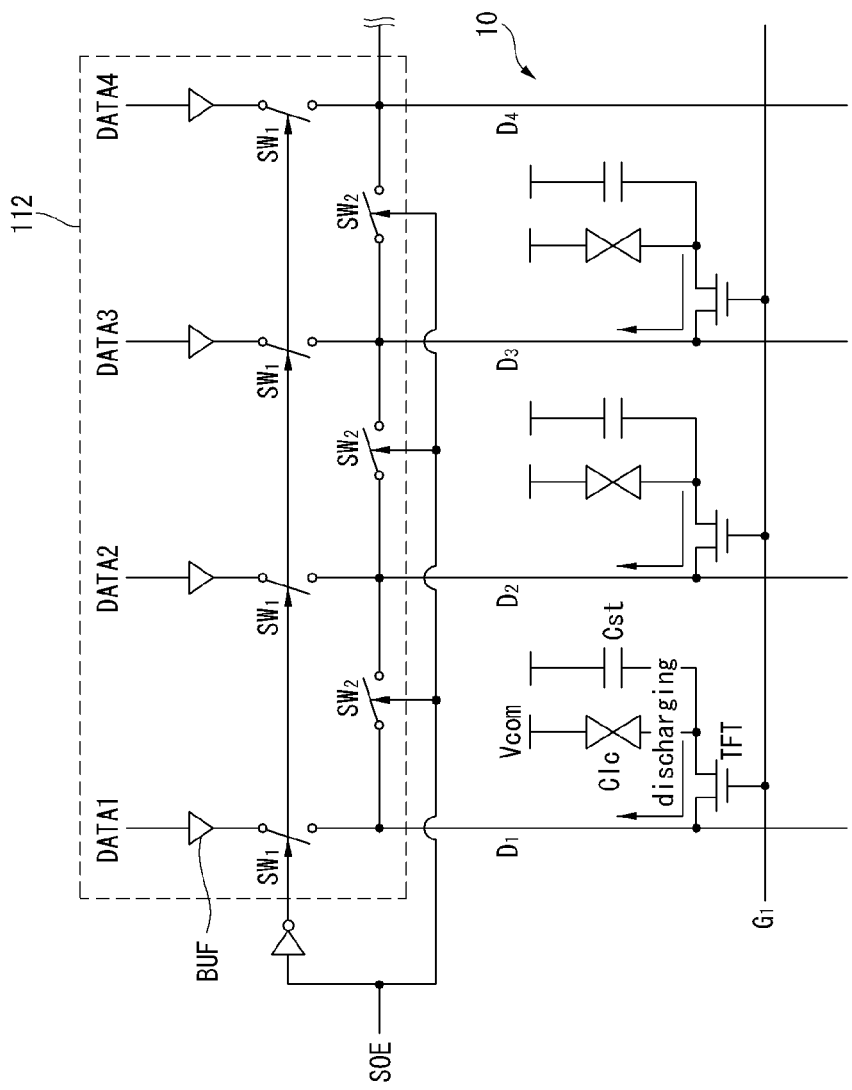
FIG. 11 is a waveform diagram illustrating an example of a charge sharing operation by the data driving circuit in a stereoscopic image display device according to a second embodiment of this document.

The data driving circuit 112 comprises a plurality of source drive integrated circuits(ICs) for driving data lines D. Each of the source drive ICs comprises a shift register, a data register, a latch, a digital to analog converter (hereinafter, referred to as "DAC"), and an output circuit. The shift register shifts a source start pulse SSP from the controller 150, in response to the source sampling clock SSC, and generates sampling signals. The shift register also shifts the source start pulse SSP and transfers a carry signal to the shift register of a next source drive IC. The data register temporarily stores the digital video data RGB' from the controller 150, and supplies the stored digital video data RGB' to the latch. The latch samples the digital video data RGB', which is received from the data register, in response to the sampling signals that are sequentially received from the shift register, latches the digital video data RGB', and outputs latched data simultaneously with latches of all source drive ICs, when the source output enable signal SOE is a logic low. The DAC converts the digital video data from the latch into a positive/negative gamma compensation voltage in response a the polarity control signal POL. The output circuit comprises an output buffer and a charge sharing circuit. The output buffer supplies the data voltage received from the DAC to the data lines D without signal attenuation. The charge sharing circuit connects the output buffers and the data lines responding the low logic value of the source output enable signal SOE, and connects neighboring data lines responding to a high logic value of the source output enable signal SOE using the switches SW1 and SW2 as shown in FIG. 11. The data driving circuit 112, at a 3D mode, modifies the left eye image data RGBL and right eye image data RGBR output from the controller 150 to gamma compensation voltages with positive and negative polarities and generates analog data voltages with positive and negative polarities. The analog data voltages with positive and negative polarities output from the data driving circuit 112 are supplied to the data lines D in the display panel 10. The gate driving circuit 111 sequentially supplies gate pulses (or scan pulses) synchronized with the data voltages to the gate lines G in the display panel 10.

The gate driving circuit 111, at a 2D mode, sequentially once supplies the gate pulses (scan pluses) to all the gate lines G from a first gate line to a last gate line in the display panel 10 during one frame period. The gate driving circuit 111, at the 3D mode, sequentially twice supplies the gate pluses to all the gate lines G from the first gate line to the last gate line in the display panel 10 during one frame period. Specifically, during one frame period, the gate pulses are sequentially supplied to all the gate lines G during the data addressing period from a start point of the frame period to a point when a predetermined time T2 has elapsed. Further, the gate pulses are sequentially supplied to all the gate lines G during the black grayscale inserting period from the predetermined time T2 to an end point of the frame period.

In FIG. 1, the backlight unit 20 provides light to the display panel 10 while turned on for a predetermined time which is set in advance, and turned off for the remaining time. The backlight unit 20 includes light sources which are turned on depending on driving powers supplied from the backlight unit driver 120, a light guide plate (or a diffusion plate), and a plurality of optical sheets. The backlight unit 20 may be implemented by a direct type backlight unit or an edge type backlight unit. The light sources of the backlight unit 20 may comprise one or more of HCFL (hot cathode fluorescent lamp), CCFL (cold cathode fluorescent lamp), EEFL (external electrode fluorescent lamp), and LED (light emitting diode).

The backlight unit driver 120 generates the driving powers for turning on the light sources of the backlight unit 20. The backlight unit driver 120 periodically supplies the driving powers to the light sources in the ON and OFF manner under the control of the controller 150.

The liquid crystal shutter glasses 30 comprise a left eye shutter STL and a right eye shutter STR which are electrically controlled independently from each other. Each of the left eye shutter STL and the right eye shutter STR comprises a first transparent substrate, a first transparent electrode formed on the first transparent substrate, a second transparent substrate, a second transparent electrode formed on the second transparent substrate, and a liquid crystal layer interposed between the first and second transparent substrates. The first transparent electrode is applied with a reference voltage, and the second transparent electrode is applied with ON and OFF voltages. Each of the left eye shutter STL and the right eye shutter STR transmits light from the display panel 10 when the ON voltage is applied to the second transparent electrode, whereas it blocks light from the display panel 10 when the OFF voltage is applied to the second transparent electrode.

The liquid crystal shutter control signal transmitter 140 is connected to the controller 150 and transmits a liquid crystal shutter glasses control signal CST to the liquid crystal shutter glasses control signal receiver 130 via a wired or wireless interface. The liquid crystal shutter glasses control signal receiver 130 is installed in the liquid crystal shutter glasses 30, receives the liquid crystal shutter control signal CST via a wired or wireless interface, and alternately opens and closes the left eye shutter STL and the right eye shutter STR in response to the liquid crystal shutter control signal CST.

When the liquid crystal shutter control signal CST having a first logic value is input to the liquid crystal shutter glasses control signal receiver 130, the second transparent electrode of the left eye shutter STL is applied with the ON voltage, whereas the second transparent electrode of the right eye shutter STR is applied with the OFF voltage. When the shutter control signal having a second logic value is input to the liquid crystal shutter glasses control signal receiver 130, the second transparent electrode of the left eye shutter STL is applied with the OFF voltage, whereas the second transparent electrode of the right eye shutter STR is applied with the ON voltage. Thus, the left eye shutter STL of the liquid crystal shutter glasses 30 is opened when the liquid crystal shutter control signal CST having the first logic value is generated, and the right eye shutter STR of the liquid crystal shutter glasses 30 is opened when the liquid crystal shutter control signal CST having the second logic value is generated. The first logic value may be set as a high logic voltage and the second logic value may be set as a low logic voltage.

The controller 150 multiples an input frame frequency by two times, and generates a display panel control signal CDIS, a backlight unit control signal CBLU, and the liquid crystal shutter glasses control signal CST with respect to the multiplied frame frequency. The input frame frequency is 50 Hz in the PAL (phase alternate line) scheme and is 60 Hz in the NTSC (national television standards committee) scheme. Therefore, the controller 150 multiplies frequencies of the display panel control CDIS, the backlight unit control signal CBLU, and the liquid crystal shutter glasses control signal CST, with respect to a frame frequency of 100 Hz or 120 Hz when multiplying the input frame frequency by two times. If the frame frequency is 100 Hz, one frame period is 10 msec, and if the frame frequency is 120 Hz, one frame period is about 8.33 msec.

In FIG. 3, the display panel control signal CDIS includes data control signals CData for controlling operation timings of the data driving circuit 112 and gate control signals CGate for controlling operation timings of the gate driving circuit 111. The data control signals CData include a source start pulse SSP, a source sampling clock SSC, a source output enable signal SOE, a polarity control signal POL, and so on. The source start pulse SSP controls data sampling start timings in the data driving circuit. The source sampling clock SSC is a clock signal which controls data sampling timings with respect to a rising edge or a falling edge in the data driving circuit. If the digital video data to be input to the data driving circuit is transmitted by a mini LVDS interface specification, the source start pulse SSP and the source sampling clock SSC may be omitted. The polarity control signal POL reverses polarities of the data voltages output from the data driving circuit at a cycle of L (where L is a natural number) horizontal period. The source output enable signal SOE controls data output timings and charge sharing timings of the data driving circuit.

The gate control signals CGate include a gate start pulse GSP, gate shift clocks GSC, a gate output enable signal GOE, and so forth. The gate start pulse GSP controls a timing of the first gate pulse. The gate shift clocks GSC are clock signals are used as clock signals for shifting the gate start pulse GSP. The gate output enable signal GOE controls output timings of the gate driving circuit 111.

In this embodiment, at the 2D mode, the gate pulses are once sequentially supplied to all the gate lines from the first gate line to the last gate line during one frame period, and, at the 3D mode, the gate pulses are twice sequentially supplied to sequentially supplied to all the gate lines from the first gate line to the last gate line during one frame period. Thus, the gate control signal CGate and the data control signal CData are required to be supplied to the display panel 10 so as to be different from each other at the 2D and 3D mode. The detailed description thereof will be described later along with FIGS. 6 and 7.

The controller 150 may comprise a frame counter, a line counter, and a memory. The frame counter detects a signal which generates one pulse during one frame period (one vertical period) such as the vertical synchronizing signal Vsync or the gate start pulse GSP, and outputs a frame count signal. The line counter detects a signal which generates one pulse during one horizontal period such as the horizontal synchronizing signal Hsync or the data enable signal DE, and outputs a line count signal.

The controller 150 can determine frame periods, turning on and off periods of the backlight unit, and operation periods of the liquid crystal shutter glasses through the frame counter and the line counter. Therefore, the controller 150 receives the frame count signal and the line count signal and generates a backlight unit control signal CBLU and the liquid crystal shutter glasses control signal CST. The turning on and off the backlight unit, and the opening and closing of the left eye shutter and right eye shutter of the liquid crystal shutter glasses will be described in detail with reference to FIGS. 4 and 5.

The controller 150 receives image data RGB from the system board 160 and outputs the received image data RGB to the data driving circuit 112. The controller 150, at the 2D mode, outputs the received image data RGB to the data driving circuit 112 of the display panel driving unit 110 as it is. The controller 150, at the 3D mode, transmits left eye image data RGBL or right eye image data RGBR of 3D image data to the data driving circuit 112 and then transmits digital data for a black grayscale (hereinafter, referred to as "black grayscale data") DB for discharging all the liquid crystal cells to the data driving circuit 112. Here, the black grayscale data DB is data stored in an internal register of the controller 150 regardless of the input 3D data. The detailed description thereof will be described later along with FIGS. 4 and 5.

The system board 160 modifies the resolution of the image data RGB suitable for the resolution of the display panel 10, and transmits various kinds of timing signals Vsync, Hsync, DE, CLK, and the like, to the controller 150.

Figure 4:
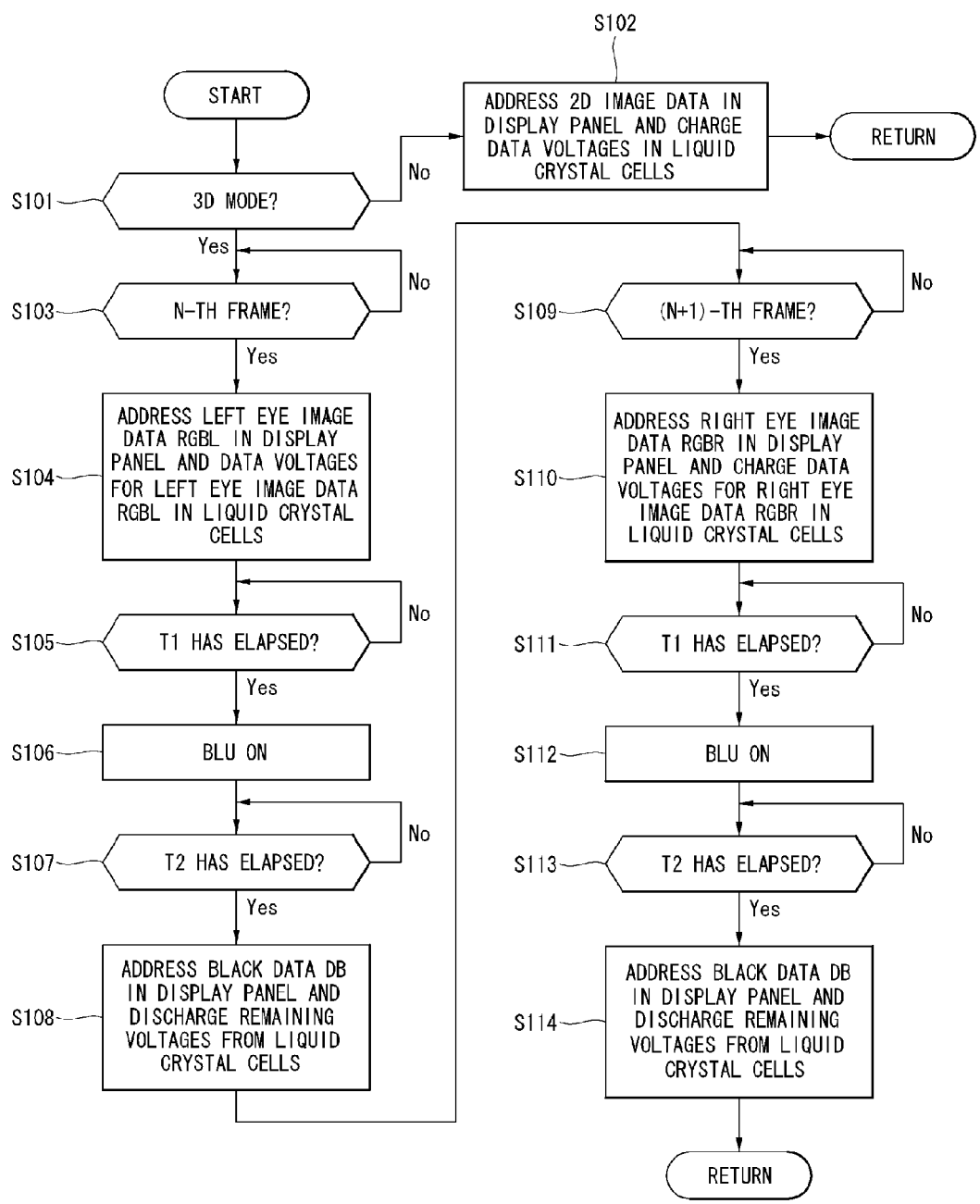
FIG. 4 is a flowchart illustrating a driving method of the stereoscopic image display device according to an embodiment of this document.

FIG. 4 is a flowchart illustrating a driving method of the stereoscopic image display device according to the first embodiment of this document. FIG. 5 is a waveform diagram illustrating the driving method of the stereoscopic image display device according to the first embodiment of this document. The driving method of the stereoscopic image display device according to the first embodiment of this document is described along with FIG. 1. In FIG. 5, the transverse axis (X axis) expresses a time, and the longitudinal axis (Y axis) expresses vertical lines V1 to V1080 in the display panel 10.

Referring to FIGS. 4 and 5, at the 2D mode, the controller 150 generates the gate control signal CGate and the data control signal CData according to the 2D mode, supplies 2D image data RGB to the data driving circuit 112, and charges data voltages for the 2D image data RGB in the liquid crystal cells Clc in the display panel 10. The controller 150 generates the backlight unit control signal CBLU having a high logic value. Here, the liquid crystal shutter glasses are operated at the 2D mode, and thus the controller 150 does not generate the liquid crystal shutter control signal CST.

The data driving circuit 112 supplies the data voltages for the 2D image data RGB to the data lines D in the display panel 10 when the N-th and (N+1)-th frame periods start. The backlight unit driver 120 turns on light sources of the backlight unit 20 in response to the backlight unit control signal CBLU having the high logic value (S101 and S102).

At the 3D mode, when the N-th frame period starts, the controller 150 generates the gate control signal CGate and the data control signal CData according to the left eye image data RGBL, supplies the left eye image data RGBL to the data driving circuit 112, and charges data voltages for the left eye image data RGBL in the liquid crystal cells Clc in the display panel 10. Further, when the N-th frame period starts, the controller 150 generates the backlight unit control signal CBLU having a second logic value and the liquid crystal shutter control signal CST having a first logic value. In this embodiment, as shown in FIG. 5, the first logic value may be set as a high logic voltage and the second logic value may be set as a low logic voltage.

When the N-th frame period starts, the data driving circuit 112 supplies the data voltages for the left eye image data RGBL to the data lines D in the display panel 10. The liquid crystal shutter glasses control signal receiver 130 opens only the left eye shutter STL in response to the liquid crystal shutter control signal CST having the high logic value (S103 and S104).

The controller 150 reverses the backlight unit control signal CBLU to have a high logic value at a point when a predetermined time T1 has elapsed from the start point of the N-th frame period. The backlight unit driver 120 turns on the light sources of the backlight unit 20 in response to the backlight unit control signal CBLU having the high logic value (S105 and S106).

The controller 150 generates the gate control signal CGate and the data control signal CData according to the black grayscale data DB at the 3D mode at a point when a predetermined time T2 has elapsed from the start point of the N-th frame period, and discharges remaining voltages of the data voltages for the left eye image data RGBL from the liquid crystal cells Clc by addressing the black grayscale data DB in the display panel 10. The controller 150 reverses the backlight unit control signal CBLU to have the low logic value again and reverses the liquid crystal shutter control signal CST to have the low logic value at a point when a predetermined time T2 has elapsed from the start point of the N-th frame period.

The data driving circuit 112 converts the black grayscale data DB into a black grayscale voltage, and supplies the black grayscale voltage to the data lines D in the display panel 10 to lead to discharging from the liquid crystal cells Clc from the predetermined time T2 to the end point of the N-th frame period (i.e., during the black grayscale inserting period of the N-th frame period). The detailed description thereof will be described later with reference to FIG. 8.

The liquid crystal shutter glasses control signal receiver 130 closes the left eye shutter STL of the liquid crystal shutter glasses and opens the right eye shutter STR thereof in response to the liquid crystal shutter control signal CST having the low logic value.

The predetermined time T2 may be determined in consideration of the response characteristics of the liquid crystal, the rising delay time of the liquid crystal, and the falling delay time of the liquid crystal. The predetermined time T2 may be set to be shorter than one frame period and longer than ½ frame period. In other words, in the case of driving at 120 Hz, since one frame period is about 8.33 msec, the predetermined time T2 may be set to be longer than 4.17 msec and shorter than 8.33 msec.

In addition, the backlight unit 20 is turned on according to the backlight unit control signal CBLU having a high logic value at a point when the predetermined time T1 has elapsed from the start point of the N-th frame period and turned off according to the backlight unit control signal CBLU having a low logic value at a point when the predetermined time T2 has elapsed from the start point of the N-th frame period. The turning-off point of the backlight unit 20 is a point when the predetermined time T2 has elapsed from the start point of the N-th and the (N+1)-th frame periods and is constant. The turning-on point of the backlight unit 20 may be varied depending on a PWM duty ratio DR for the backlight unit 20. The PWM duty ratio DR indicates a ratio of a turning-on time of the backlight unit 20. The PWM duty ratio DR is expressed as shown in Equation (3).

$$DR(\%) = \frac{d_1}{d_1 + d_2} \times 100 \quad (3)$$

In Equation (3), DR indicates a PWM duty ratio, d1 indicates a high section of the PWM signal (turning-on time of the backlight unit), and d2 indicates a low section thereof (turning-off time of the backlight unit). The value d1 indicates a difference T2-T1 between the predetermined time T2 and the predetermined time T1, which corresponds to the turning-on time (i.e., the time period during which the backlight unit control signal CBLU has a high logic value), and since the backlight unit 20 in this embodiment is turned on at a constant PWM duty ratio every frame period, the value d1+d2 indicates one frame period. For example, if the PWM duty ratio DR is set to 20%, since one frame period is 8.33 msec in the driving of 120 Hz, the turning-on time T2-T1 of the backlight unit 20 may be set to 1.67 msec (S107 and S108).

When the (N+1)-th frame period starts, the controller 150 generates the gate control signal CGate and the data control signal CData according to the right eye image data RGBR, addresses the right eye image data RGBR in the display panel 10, and charges data voltages for the right eye image data RGBR in the liquid crystal cells Clc. Further, when the (N+1)-th frame period starts, the controller 150 generates the backlight unit control signal CBLU having a low logic value and the liquid crystal shutter control signal CST having a low logic value.

When the (N+1)-th frame period starts, the data driving circuit 112 supplies the data voltages for the right eye image data RGBR to the data lines D in the display panel 10. The liquid crystal shutter glasses control signal receiver 130 opens only the right eye shutter STR of the liquid crystal shutter glasses in response to the liquid crystal shutter control signal CST having the low logic value (S109 and S110).

The controller 150 reverses the backlight unit control signal CBLU to have the high logic value at a point when a predetermined time T1 has elapsed from the start point of the (N+1)-th frame period. The backlight unit driver 120 turns on the light sources of the backlight unit 20 in response to the backlight unit control signal CBLU having the high logic value (S111 and S112).

The controller 150 generates the gate control signal CGate and the data control signal CData according to the black grayscale data DB at the 3D mode at a point when the predetermined time T2 has elapsed from the start point of the (N+1)-th frame period, and discharges remaining voltages of the data voltages for the right eye image data RGBR from the liquid crystal cells Clc by addressing the black grayscale data DB in the display panel 10. The controller 150 reverses the backlight unit control signal CBLU to have the low logic value again, and reverses the liquid crystal shutter control signal CST to have the high logic value at a point when a predetermined time T2 has elapsed from the start point of the (N+1)-th frame period.

The data driving circuit 112 converts the black grayscale data DB into a black grayscale voltage, and supplies the black grayscale voltage to the data lines D in the display panel 10 to lead to discharging from the liquid crystal cells Clc from the start point of the (N+1)-th frame period to a point when the predetermined time T2 has elapsed (i.e., during the data addressing period of the (N+1)-th frame period).

The liquid crystal shutter glasses control signal receiver 130 closes the right eye shutter STR of the liquid crystal shutter glasses and opens the left eye shutter STL thereof in response to the liquid crystal shutter control signal CST having the high logic value (S113 and S114). The predetermined time T1, the predetermined time T2, and the turning-on timing of the backlight unit have been described above.

Figure 6:
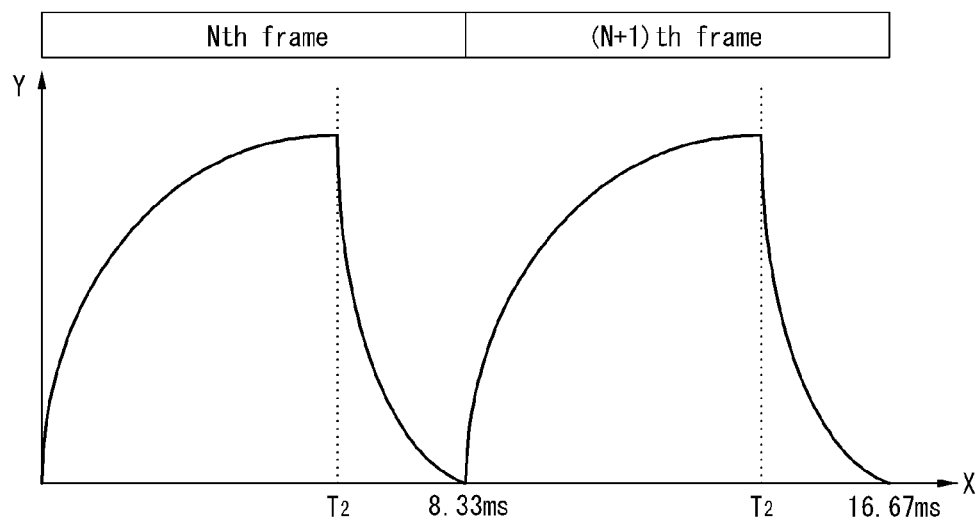
FIG. 6 is a graph illustrating a response characteristic of the liquid crystal in the display panel at the 3D mode.

FIG. 6 is a graph illustrating the response characteristics of the liquid crystal in the display panel at the 3D mode. The response characteristics of the liquid crystal in the display panel according to this embodiment will be described with reference to FIGS. 1 and 5. In FIG. 6, the transverse axis (X axis) expresses a time, and the longitudinal axis (Y axis) expresses brightness.

The controller 150 addresses monocular (left eye or right eye) image data RGBL and RGBR during the data addressing period from the start point of each of the N-th and (N+1)-th frame periods to the point when the predetermined time T2 has elapsed, and addresses the black grayscale data DB during the black grayscale inserting period from the predetermined time T2 to the end point of each of the N-th and (N+1)-th frame periods. As shown in FIG. 6, the response curve reaches a target brightness at the point when the predetermined time T2 has elapsed from the start point of the N-th and (N+1)-th frame periods and reaches the black brightness at the point when each of the N-th and (N+1)-th frame periods end.

Finally, the remaining voltages of the monocular image data is discharged to the black grayscale voltage during the black grayscale inserting period from the predetermined time T2 to the end point of each of the N-th and (N+1)-th frame periods, and thereby data voltages for next monocular image data are charged in the liquid crystal cells Clc in the state where the remaining voltages for a previous monocular image are completely discharged. Therefore, the previous monocular image and the next monocular image do not overlap each other, and thereby it is possible to improve the 3D crosstalk.

Figure 7:
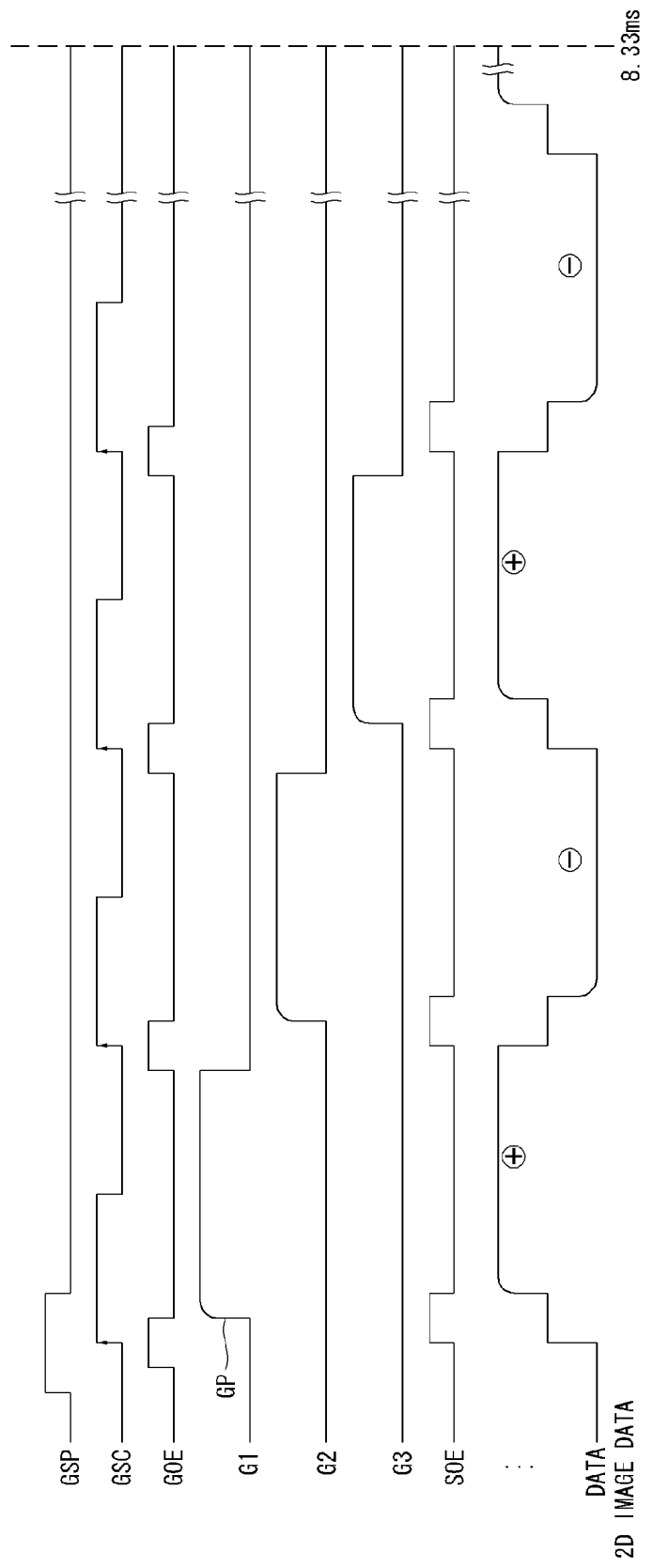
FIG. 7 is a waveform diagram illustrating timing signals and data voltages when the 2D mode is implemented.
Figure 8:
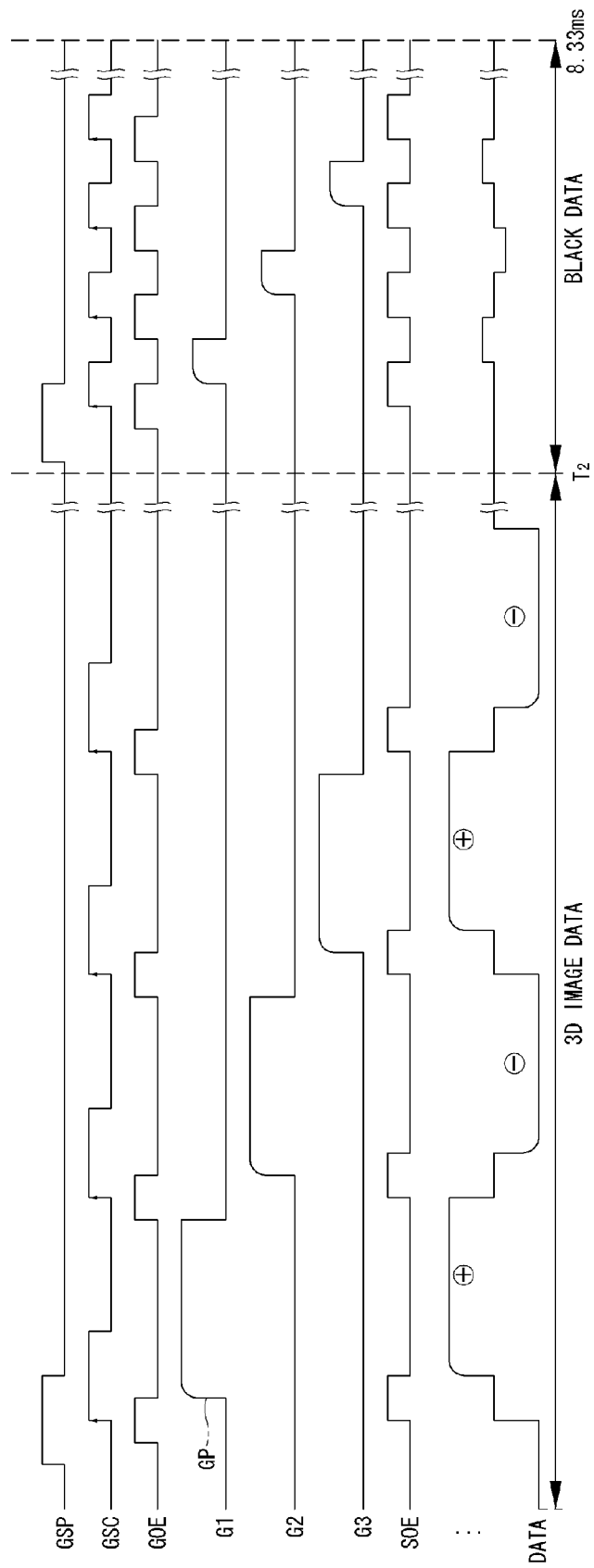
FIG. 8 is a waveform diagram illustrating timing signals and data voltages when the 3D mode is implemented.

FIG. 7 is a waveform diagram illustrating timing signals and data voltages when the 2D mode is implemented, and FIG. 8 is a waveform diagram illustrating timing signals and data voltages when the 3D mode is implemented. The waveforms of the timing signals and the data voltages when the 2D or 3D mode is implemented will be described along with FIG. 1.

The controller 150 addresses the 2D image data RGB in the display panel 10 during one frame period at the 2D mode, or addresses the left eye image data RGBL or the right eye image data RGBR and the black grayscale data DB in the display panel 10 during one frame period at the 3D mode. In other words, the controller 150 once supplies the gate pulses to the gate lines G in the display panel 10 during one frame period at the 2D mode, or twice supplies the gate pulses to the gate lines G during one frame period at the 3D mode. Therefore, the gate pulses and the data voltages are supplied to the display panel 10 so as to be different from each other at the 2D and 3D modes, and the description thereof will now be described in detail.

In FIG. 7, at the 2D mode, during one frame period, the gate driving circuit 111 receives the gate start pulse GSP, the gate shift clocks GSC, the gate output enable signal GOE, and the like from the controller 150, and supplies the gate pulses GP to the gate lines G1 to G3. The gate driving circuit 111 shifts the gate start pulse GSP for each rising edge of the gate shift clocks GSC to generate outputs of a shift register, and provides the outputs to the gate lines as the gate pulses GP during the low level duration of the gate output enable signal GOE. The gate pulses GP are sequentially supplied to the gate lines G1 to G3.

The data driving circuit 112 receives the source output enable signal SOE, the 2D image data RGB, and so forth from the controller 150, and converts the 2D image data RGB into data voltages for supply to the data lines D in response to the source output enable signal SOE. Thus, the liquid crystal cells Clc charges therein the data voltages for the 2D image data RGB supplied via the TFTs which are turned on by the gate pulses GP.

In FIG. 8, the gate driving circuit 111 twice supplies the gate pulses GP during the one frame period at the 3D mode. That is, the gate driving circuit 111 once supplies the gate pulses GP during the data addressing period from the start point of the N-th frame period to the point when the predetermined time T2 has elapsed, and supplies the gate pulses GP during the black grayscale inserting period from the predetermined time T2 to the end point of the N-th frame period once more. Since the predetermined time T2 is longer than the ½ frame period, the gate pulses GP from the start point of the N-th frame period to the point when the predetermined time T2 has elapsed are wider than the gate pulses GP from the predetermined time T2 to the end point of the N-th frame period. The supply of the gate pulses GP during the (N+1)-th frame period is the same as that during the N-th frame period.

The data driving circuit 112 supplies the 3D left eye image data RGBL or the right eye image data RGBR during the data addressing period from the start point of the N-th frame period to the point when the predetermined time T2 has elapsed, and supplies the black grayscale data DB during the black grayscale inserting period from the predetermined time T2 to the end point of the N-th frame period. Since the predetermined time T2 is longer than ½ frame period, an output time of the data driving circuit 112 per unit data from the start point of the N-th frame period to the point when the predetermined time T2 has elapsed is longer than an output time thereof from the predetermined time T2 to the end point of the N-th frame period. In other words, a cycle of the source output enable signal SOE from the start point of the N-th frame period to the point when the predetermined time T2 has elapsed is longer than a cycle of the source output enable signal SOE from the predetermined time T2 to the end point of the N-th frame period. The source output enable signal SOE during the (N+1)-th frame period is the same as the source output enable signal SOE during the N-th frame period.

During the black grayscale inserting period of each of the N-th and (N+1)-th frame periods, the black grayscale voltage is sequentially supplied to the data lines D in the display panel 10. In this case, the liquid crystal cells Clc in the display panel 10 are charged with the voltages for the left eye image data RGBL or the right eye image data RGBR. If the gate terminals of the TFTs are turned on by the gate pulses supplied during the black grayscale inserting period, the remaining voltages charged in the liquid crystal cells Clc by the data lines D and the liquid crystal cells Clc are discharged to the data lines D.

As described above, in the first embodiment according to the present invention, at the 3D mode, one frame period is temporally divided into the data addressing period where video data is addressed in the liquid crystal cells Clc in the display panel 10 and the black grayscale inserting period where black grayscale data is addressed in the liquid crystal cells Clc. In this embodiment, as described above, the black grayscale inserting period may be implemented by writing the black grayscale data in the liquid crystal cells Clc.

With respect to FIGS. 9 to 11, a stereoscopic image display device and a driving method thereof according to a second embodiment of the present invention will be described in detail. In the second embodiment, the black grayscale inserting period may be implemented by discharging the voltages charged in the liquid crystal cells Clc to the black grayscale voltage through a charge-sharing method among the data lines D1 to D4, instead of by writing the black grayscale data.

Figure 9:
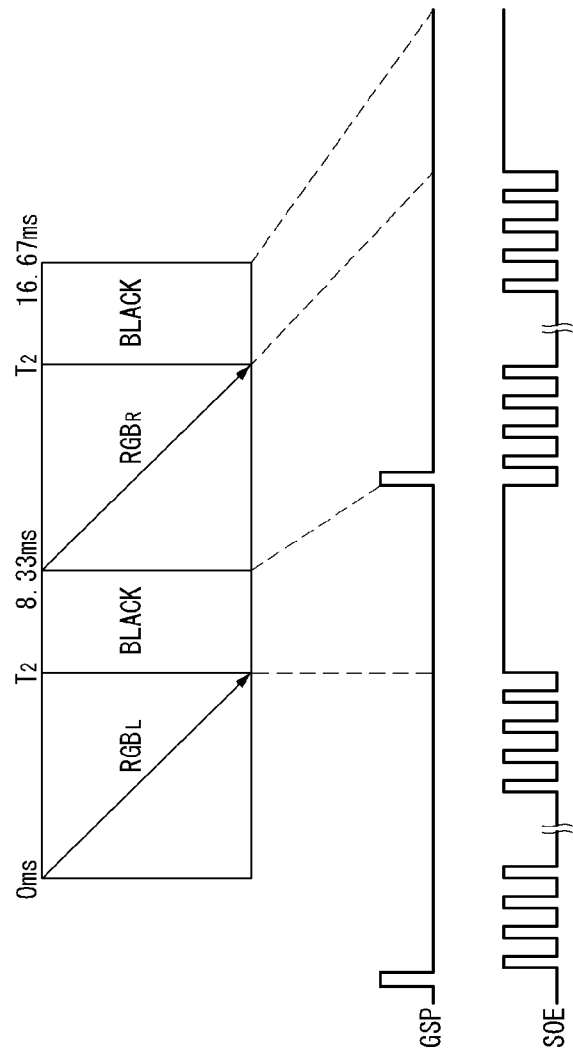
FIG. 9 is a waveform diagram illustrating a source output enable signal for leading to discharging from the liquid crystal cells at the 3D mode.
Figure 10:
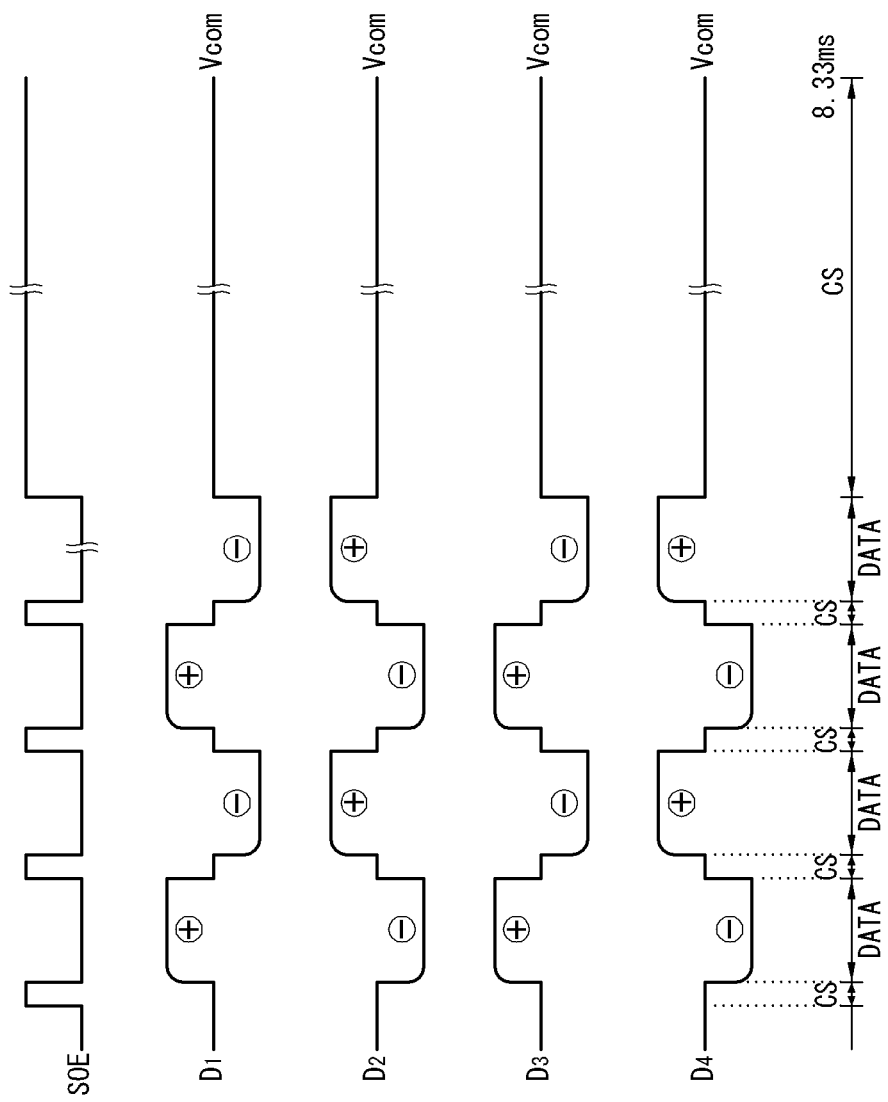
FIG. 10 is a waveform diagram illustrating voltages at the data lines controlled by the source output enable signal as shown in FIG. 9.

In FIGS. 9 to 11, the controller 150 generates pulses of the source output enable signal SOE substantially every one horizontal period during the data addressing period, and maintains the source output enable signal SOE to have a certain logic value, e.g., a high logic voltage, during the black grayscale inserting period. As is known in the art, the horizontal period is a scan time corresponding to one cycle of the gate output enable signal GOE and the source output enable signal SOE. Again, the data addressing period indicates a period for addressing left eye image data or right eye image data in all pixels of the display panel, and the black grayscale inserting period indicates a period for adjusting voltages of all the pixels of the display panel to a black grayscale voltage.

The data driving circuit 112 supplies left eye image data voltages and right eye image data voltage, e.g. data voltages DATA1 to DATA4 shown in FIG. 11, to the data lines D1 to D4 in response to a low logic voltage of the source output enable signal SOE, and connects the neighboring data lines D1 to D4 to each other so as to be short-circuited in response to the high logic voltage of the source output enable signal SOE, thereby adjusting the voltages at the data lines D1 to D4 equal to a certain voltage, e.g. the black grayscale voltage.

For this, as shown in FIG. 11, an output circuit of the data driving circuit 112 includes first switches SW1 which selectively connect the output buffers BUF to their respective data lines D1 to D4 and second switches SW2 which selectively connect the neighboring data lines D1 to D4. The first switches SW1 connects the output buffers BUF to the data lines D1 to D4 for supplying left eye image data voltages and right eye image data voltages to the data lines in response to the low logic voltage of the source output enable signal SOE, and block a current path between the output buffers BUF and the data lines D1 to D4 when the source output enable signal SOE has the high logic value. The second switches SW2 connects neighboring data lines D1 to D4 each other in response to the high logic voltage of the source output enable signal SOE to thereby enable charge-sharing among the neighboring data lines, and block the current path between neighboring data lines D1 to D4 when the source output enable signal SOE has the low logic voltage. Except for the above specific structure in the output circuit of the data driving circuit, the configuration of the stereoscopic image display device according to the second embodiment is the same as that in the first embodiment as shown in FIG. 1.

The charge-sharing among the data lines D1 to D4 occurs during the pulse width period or when the source output enable signal SOE has the high logic voltage. As shown in FIGS. 10 and 11, when the charge-sharing operation CS among the data lines D1 to D4 is performed, the TFTs are turned on by the gate pulses, and the voltages in the liquid crystal cells are discharged via the data lines D1 to D4, and in turn reaches an average voltage of the positive data voltage and the negative data voltage, that is, nearly the common voltage Vcom. The level of the common voltage Vcom corresponds to the black grayscale voltage. Therefore, during the black grayscale inserting period at the 3D mode, the gate pulses are applied to the gate lines G1, the source output enable signal SOE is maintained to have the high logic voltage, and thereby the liquid crystal cells are discharged to the black grayscale voltage.

Figure 12:
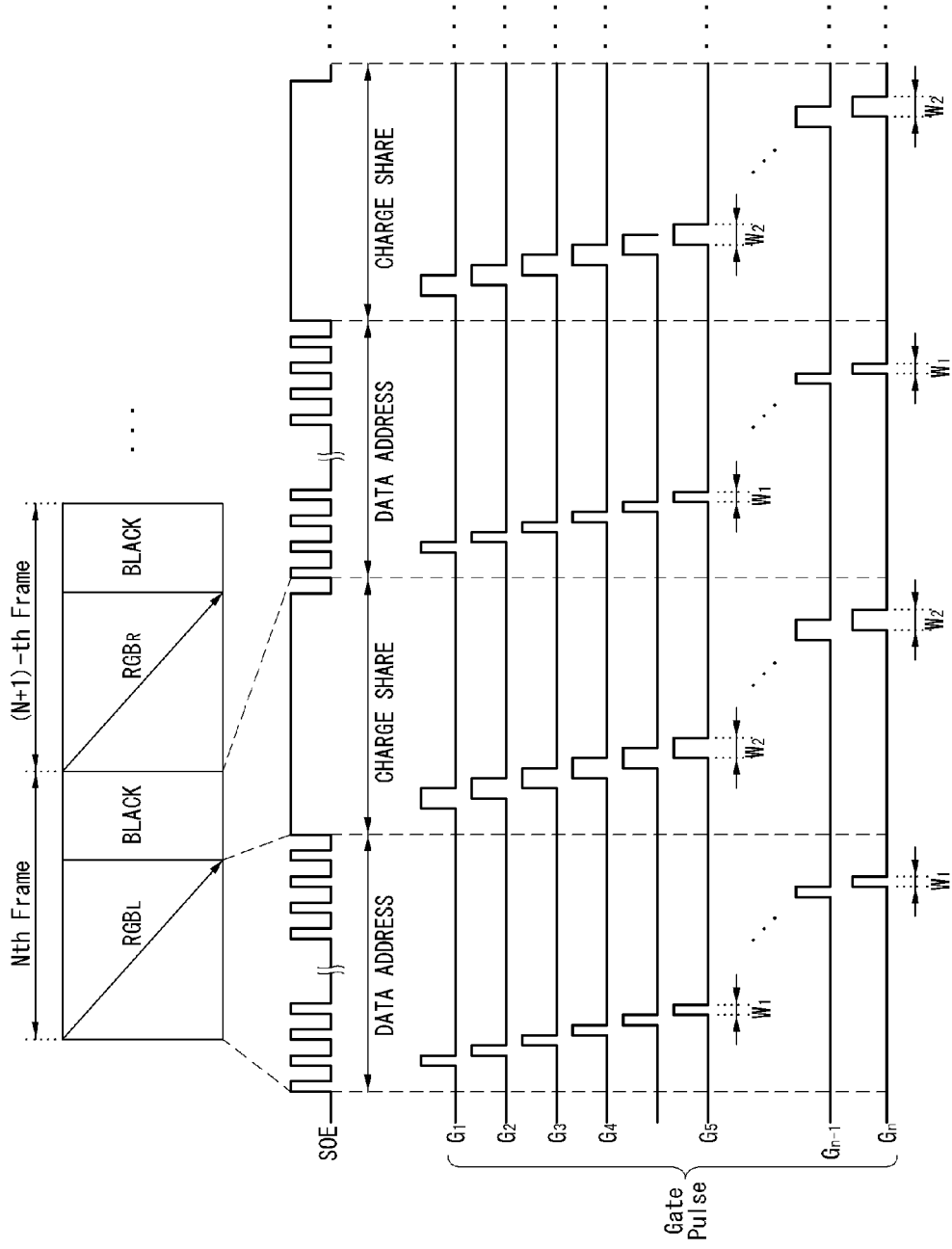
FIG. 12 is a diagram illustrating gate pulses generated during the data addressing period and the black grayscale inserting period.

According to this invention, in order to increase the number of the TFTs turned on at the same time in the TFT array and to sufficiently lengthen the turned-on time of TFTs at the 3D mode, during the black grayscale inserting period, the gate pulses supplied to the neighboring gate lines may overlap with each other as shown in FIG. 12. When the gate pulses overlap with each other, the pulse widths W2 of the gate pulses can be lengthened more than one horizontal period. On the contrary, during the data addressing period, the pulse widths W1 of the gate pulses do not overlap with each other and are set to about one horizontal period. The pulse widths W1 and W2, the overlapping, and the non-overlapping of the gate pulses may be controlled by the gate control signal CGate generated by the controller 150.

As described above, according to this document, the left eye images and the right eye images of the 3D images are driven at the frame frequency of 120 Hz in the temporal division manner, the data voltages for the previous monocular (left eye or right eye) images which have been charged in the liquid crystal cells for a portion of the previous monocular image frame period, and thereafter the data voltages for the next monocular images are charged. As a result, the stereoscopic image display device in this document can drive the 3D images at the frame frequency of 120 Hz and minimize the 3D crosstalk, and reduce circuit costs as compared with stereoscopic image display devices driven at the frame frequency of 240 Hz in the related art.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device, comprising:
a display panel configured to include data lines, gate lines intersecting the data lines, and the pixels arranged in a matrix in pixel regions defined by the data lines and the gate lines;
liquid crystal shutter glasses configured to have a left eye shutter and a right eye shutter which can be controlled electrically;
a data driving circuit configured to supply left eye image data voltages to the data lines during a data addressing period set in an N-th (where N is a natural number) frame period and connects neighboring data lines with each other to make the data lines short-circuited during a black grayscale inserting period set in the N-th frame period, and supply right eye image data voltages to the data lines during a data addressing period set in a (N+1)-th frame period and connects neighboring data lines with each other to make the data lines short-circuited during the black grayscale inserting period set in the N-th frame period;
a gate driving circuit configured to sequentially supply a first gate pulse to the gate lines during the data addressing period and a second gate pulse to the gate lines during the black grayscale inserting period; and
a backlight unit configured to provide light to the display panel,
wherein only the left eye shutter is opened during the data addressing period set in the N-th frame period, and then the left eye shutter is closed and the right eye shutter is opened during the black grayscale inserting period set in the N-th frame period,
wherein only the right eye shutter is opened during the data addressing period set in the (N+1)-th frame period, and then the right eye shutter is closed and the left eye shutter is opened during the black grayscale inserting period set in the (N+1)-th frame period, and
wherein the backlight unit is turned off from a start point of each of the N-th and the (N+1)-th frame periods to a point when a second predetermined time (T1) has elapsed, is then turned on from the second predetermined time (T1) to a point when a first predetermined time (T2) has elapsed, and is then turned off again from the first predetermined time (T2) to an end point of the frame period.

2. The stereoscopic image display device of claim 1, wherein the pixels are charged with the left eye image data voltages during the data addressing period set in an N-th frame period and then discharged to the black grayscale voltage during the black grayscale inserting period set in the N-th frame period, and charged with the right eye image data voltages during the data addressing period set in a (N+1)-th frame period and then discharged to the black grayscale voltage during the black grayscale inserting period set in the (N+1)-th frame period.

3. The stereoscopic image display device of claim 1, wherein the data addressing period is set from a start point of each of the N-th frame period and the (N+1)-th frame period to a point when a first predetermined time (T2) has elapsed, and the black grayscale inserting period is set from the first predetermined time (T2) to an end point of each of the N-th frame period and the (N+1)-th frame period, and
wherein the first predetermined time (T2) is set to be shorter than one frame period and longer than ½ frame period.

4. The stereoscopic image display device of claim 1, further comprising:
a controller configured to generate a source output enable signal (SOE) for controlling the output timings of the data driving circuit, and supplies it to the data driving circuit,
wherein the data driving circuit supplies the left eye image data voltages and the right eye image data voltages to the data lines in response to a first logic of the source output enable signal (SOE), and connects the neighboring data lines to make the data lines short-circuited in respond to a second logic of the source output enable signal (SOE).

5. The stereoscopic image display device of claim 4, wherein, the controller generates pulses of the source output enable signal (SOE) every one horizontal period during the data addressing period, and maintains the source output enable signal (SOE) to have the second logic during the black grayscale inserting period.

6. The stereoscopic image display device of claim 4, wherein the data driving circuit includes an output circuit having first switches which selectively connect the output buffers and the data lines for supplying left eye image data voltages and right eye image data voltages to the data lines, and second switches which selectively connect the neighboring data lines.

7. The stereoscopic image display device of claim 4, wherein the cycle of the source output enable signal (SOE) during the data addressing period is longer than the cycle of the source output enable signal (SOE) during the black grayscale inserting period.

8. The stereoscopic image display device of claim 1, wherein during the black grayscale inserting period, the gate pulses supplied to the neighboring gate lines overlap with each other, and during the data addressing period, the gate pulses do not overlap with each other.

9. The stereoscopic image display device of claim 1, wherein during the black grayscale inserting period, the gate pulses are set to be more than one horizontal period, and during the data addressing period, the gate pulses are set to be about one horizontal period.

10. A driving method of a stereoscopic image display device including a display panel which is provided with data lines, gate lines intersecting the data lines, and the pixels arranged in a matrix in pixel regions defined by the data lines and the gate lines, the method comprising:
electrically controlling liquid crystal shutter glasses to alternately open a left eye shutter and a right eye shutter of the liquid crystal shutter glasses;
supplying left eye image data voltages to the data lines during a data addressing period set in an N-th (where N is a natural number) frame period and connecting neighboring data lines with each other to make the data lines short-circuited during a black grayscale inserting period set in the N-th frame period, and supplying right eye image data voltages to the data lines during a data addressing period set in a (N+1)-th frame period and connecting neighboring data lines with each other to make the data lines short-circuited during the black grayscale inserting period set in the N-th frame period;
sequentially supplying a first gate pulse to the gate lines during the data addressing period and a second gate pulse to the gate lines during the black grayscale inserting period; and
providing light to the display panel using a backlight unit,
wherein in the operation of electrically controlling of the liquid crystal shutter glasses, only the left eye shutter is opened during the data addressing period set in an N-th frame period, and then the left eye shutter is closed and the right eye shutter is opened during the black grayscale inserting period set in the N-th frame period,
wherein only the right eye shutter is opened during the data addressing period set in a (N+1)-th frame period, and then the right eye shutter is closed and the left eye shutter is opened during the black grayscale inserting period set in the (N+1)-th frame period, and
wherein, in the operation of providing of light, the backlight unit is turned off from a start point of each of the N-th and the (N+1)-th frame periods to a point when a second predetermined time (T1) has elapsed, is then turned on from a second predetermined time (T1) to a point when a first predetermined time (T2) has elapsed, and is then turned off again from the first predetermined time (T2) to an end point of the frame period.

11. The driving method of claim 10, wherein the pixels are charged with the left eye image data voltages during the data addressing period set in an N-th frame period and then discharged to the black grayscale voltage during the black grayscale inserting period set in the N-th frame period, and charged with the right eye image data voltages during the data addressing period set in a (N+1)-th frame period and then discharged to the black grayscale voltage during the black grayscale inserting period set in the (N+1)-th frame period.

12. The driving method of claim 10, wherein the data addressing period is set from a start point of each of the N-th frame period and the (N+1)-th frame period to a point when a first predetermined time (T2) has elapsed, and the black grayscale inserting period is set from the first predetermined time (T2) to an end point of each of the N-th frame period and the (N+1)-th frame period, and
wherein the first predetermined time (T2) is set to be shorter than one frame period and longer than ½ frame period.

13. The driving method of claim 10 further comprising:
generating a source output enable signal (SOE),
wherein the step of addressing the left eye image data or the right eye image data and adjusting voltages of all the pixels comprises:

supplying left eye image data voltages and right eye image data voltages to the data lines in response to a first logic of the source output enable signal (SOE), and connects the neighboring data lines to make the data lines short-circuited in respond to a second logic of the source output enable signal (SOE).

14. The driving method of claim 13, wherein, the generation step of the source output enable signal (SOE) comprises:
generating pulses of the source output enable signal (SOE) every one horizontal period during the data addressing period, and maintaining the source output enable signal (SOE) to have the second logic during the black grayscale inserting period.

15. The driving method of claim 14, wherein, the cycle of the source output enable signal (SOE) during the data addressing period is longer than the cycle of the source output enable signal (SOE) during the black grayscale inserting period.

16. The driving method of claim 10, wherein during the black grayscale inserting period, the gate pulses supplied to the neighboring gate lines overlap with each other, and during the data addressing period, the gate pulses do not overlap with each other.

17. The driving method of claim 10, wherein during the black grayscale inserting period, the gate pulses are set to be more than one horizontal period, and during the data addressing period, the gate pulses are set to be about one horizontal period.

* * * * *